United States Patent
Das et al.

(10) Patent No.: US 8,473,559 B2
(45) Date of Patent: Jun. 25, 2013

(54) CONFERENCE-ENHANCING ANNOUNCEMENTS AND INFORMATION

(75) Inventors: Sreerupa Das, Arvada, CO (US);
ShengXiang Gui, Broomfield, CO (US);
Ashis Maity, Arvada, CO (US); Joseph McCabe, Pueblo, CO (US); Michael J. Thomas, Denver, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 122 days.

(21) Appl. No.: 12/951,431

(22) Filed: Nov. 22, 2010

(65) Prior Publication Data

US 2011/0093548 A1 Apr. 21, 2011

Related U.S. Application Data

(62) Division of application No. 12/098,552, filed on Apr. 7, 2008, now abandoned.

(51) Int. Cl.
*G06F 15/16* (2006.01)

(52) U.S. Cl.
USPC ............................................. 709/206; 709/204

(58) Field of Classification Search
USPC ................................................ 709/204, 206
See application file for complete search history.

(56) References Cited

U.S. PATENT DOCUMENTS

| | | | | |
|---|---|---|---|---|
| 4,577,065 A * | 3/1986 | Frey et al. | ................ | 379/204.01 |
| 5,668,863 A * | 9/1997 | Bieselin et al. | .......... | 379/202.01 |
| 6,674,459 B2 * | 1/2004 | Ben-Shachar et al. | ..... | 348/14.09 |
| 7,209,947 B1 * | 4/2007 | Lee et al. | ...................... | 709/204 |
| 7,679,518 B1 * | 3/2010 | Pabla et al. | ................ | 340/573.1 |
| 2002/0076025 A1 * | 6/2002 | Liversidge et al. | ...... | 379/202.01 |
| 2002/0078150 A1 * | 6/2002 | Thompson et al. | .......... | 709/204 |
| 2003/0021400 A1 * | 1/2003 | Grandgent et al. | ...... | 379/202.01 |
| 2003/0065722 A1 * | 4/2003 | Ieperen | ........................ | 709/205 |
| 2004/0199580 A1 * | 10/2004 | Zhakov et al. | ................ | 709/204 |
| 2006/0053194 A1 * | 3/2006 | Schneider et al. | ............ | 709/204 |
| 2006/0053195 A1 * | 3/2006 | Schneider et al. | ............ | 709/204 |
| 2006/0088806 A1 * | 4/2006 | Quinn | ........................... | 434/236 |
| 2006/0106872 A1 * | 5/2006 | Leban et al. | ............... | 707/104.1 |

\* cited by examiner

*Primary Examiner* — David Lazaro
*Assistant Examiner* — Vitali Korobov

(57) ABSTRACT

A conference participant attempting to log into a conference that has been rescheduled is informed that the conference has been rescheduled to such-and-such date and/or time. If the login attempt is before or during the conference, the participant is offered information pertaining to the conference. If the login attempt is after the conference has ended, the participant is offered the information plus a recording of the conference. An identifier is associated with the conference and used by the host and the participants to uniquely identify the conference.

4 Claims, 3 Drawing Sheets

CONFERENCE-ENHANCING ANNOUNCEMENTS AND INFORMATION

CROSS-REFERENCE TO RELATED APPLICATIONS

This application is a divisional application of U.S. patent application Ser. No. 12/098,552, filed on Apr. 7, 2008, and claims the benefit thereof.

TECHNICAL FIELD

This invention relates to telecommunications conferencing.

BACKGROUND OF THE INVENTION

Currently, people use the functionality of their electronic calendar applications, such as the "Meeting Request" functionality of the Microsoft Outlook calendar, to schedule audio conferences. The conference host sends an e-mail meeting request to the desired conference participants that includes the date and time of the conference, the conference bridge number, and the host's and participants' access codes. The calendar of a participant who receives the request is populated with this information. If later the host needs to reschedule the conference to another date or time, the calendaring application informs every participant about the change via an updated e-mail meeting request. The latest meeting information is available in the updated e-mail. But sometimes, a participant who has not checked their e-mail mailbox or calendar for meeting request updates will call into the conference at the originally-scheduled date and time, only to discover (eventually infer) that the conference is not taking place. This wastes the participant's time.

SUMMARY OF THE INVENTION

According to an aspect of the invention, when a conference participant attempts to join a scheduled conference—for example, at the originally-scheduled date and/or time for the conference—but the conference has been rescheduled to another date and/or time, the participant is informed that the conference has been rescheduled. Illustratively, a conference bridge is enhanced with an announcement capability that informs the participant of the rescheduling. Illustratively, in addition, if a participant attempts to join the conference before the conference has begun, the participant is offered information pertaining to the conference. This information may include the conference agenda, identification of attendees, and contact information for host and/or attendees or invitees, download location of documents to have handy for the conference, etc. This information may also be offered to the participant if he or she attempts to join the conference while it is in progress. Further illustratively, the conference is recorded, and if the participant attempts to join the conference after it has ended, the participant is offered the abovementioned information pertaining to the conference plus the recording of the conference. Advantageously, a unique identifier is associated with the conference and is used to uniquely identify the conference.

DETAILED DESCRIPTION

Figure 1:
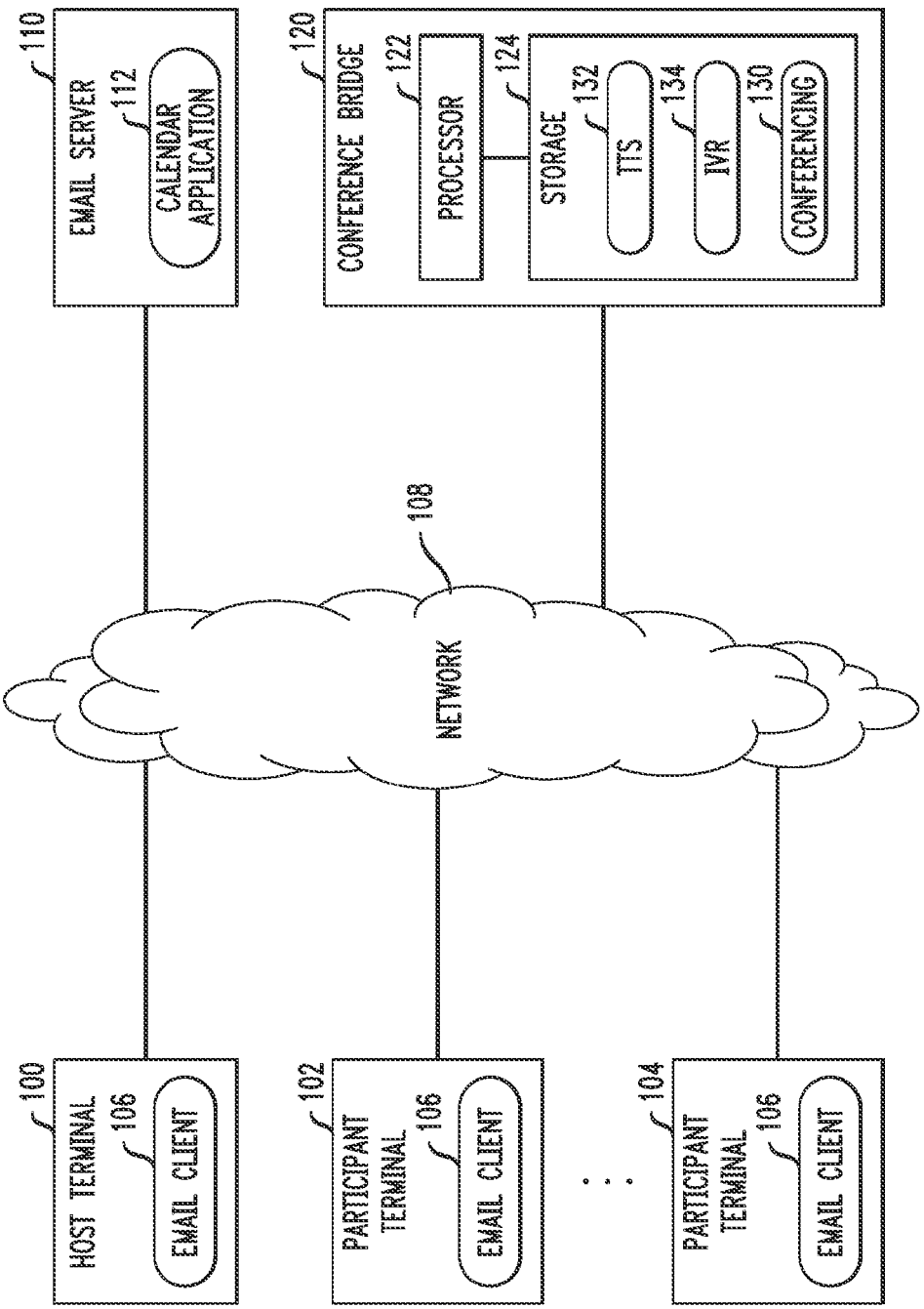
FIG. 1 is a block diagram of a communications system that includes an illustrative embodiment of the invention.

FIG. 1 shows a communications system comprising a plurality of user communications terminals 100-104 connected by a communications network 108 to an email server 110 and a conference bridge 120. Network 108 is any desired communications network, be it circuit-switched like the public service telephone network or packet-switched such as a local area network or the Internet.

Correspondingly, terminals 100-104 are any desired terminals that are capable of communicating via network 108, such as wired or wireless telephones, voice over the internet (VoIP) terminals, softphone-enabled computers, personal digital assistants, etc. Each terminal 100-104 includes an email client function 106 that enables the terminal to engage in email communications via email server 110, such as a Microsoft Outlook client, for example. Alternatively, each terminal 100-104 comprises a voice-communications terminal, such as a telephone, and a separate data communications terminal, such as a personal computer, that implements email client function 106.

Email server 110 is any desired server that cooperates with email clients 106 to implement an email capability, such as a Microsoft Exchange server, for example. Alternatively, a different data or text messaging capability could be used, such as instant messaging. Email server 110 includes an electronic calendaring application 112, such as the Microsoft Outlook application, for example.

Conference bridge 120 provides communications conferencing services to terminals 100-104, such as voice-call conferencing, data conferencing, video conferencing, and/or multimedia conferencing. For ease of description, conference bridge 120 will be assumed herein to provide an audio-conferencing service. Conference bridge 120 is a stored-program controlled entity that comprises storage 124 for storing data and programs including a conferencing program, and a processor 122 for executing the programs and using and/or generating the data. Conference bridge 120 is illustratively the Avaya Meet-Me reservationless conference bridge. As described so far, the system of FIG. 1 is conventional.

Figure 2:
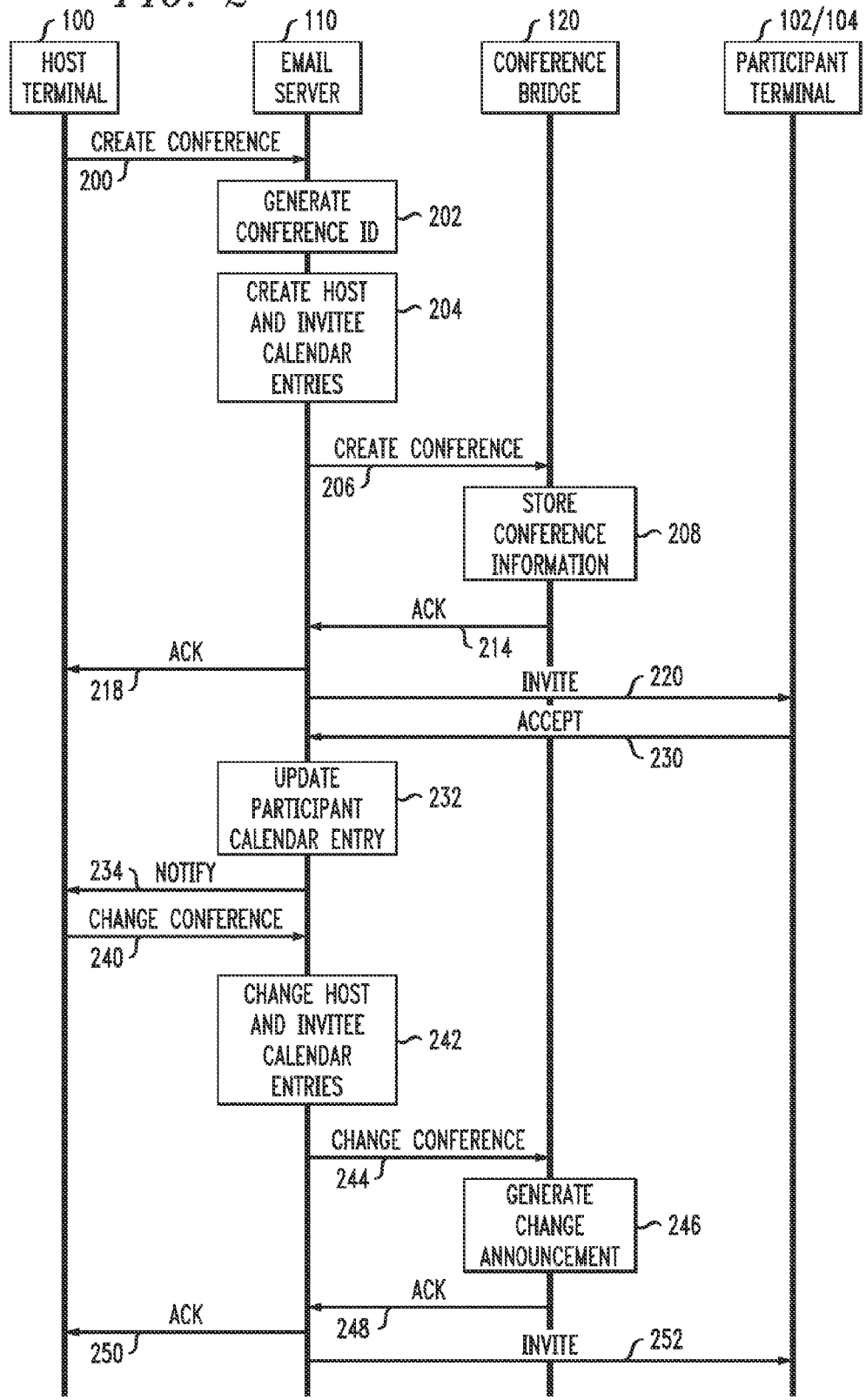
FIGS. 2 and 3 are a functional-flow and message-flow diagram for the terminals, email server, and conference bridge of the system of FIG. 1.
Figure 3:
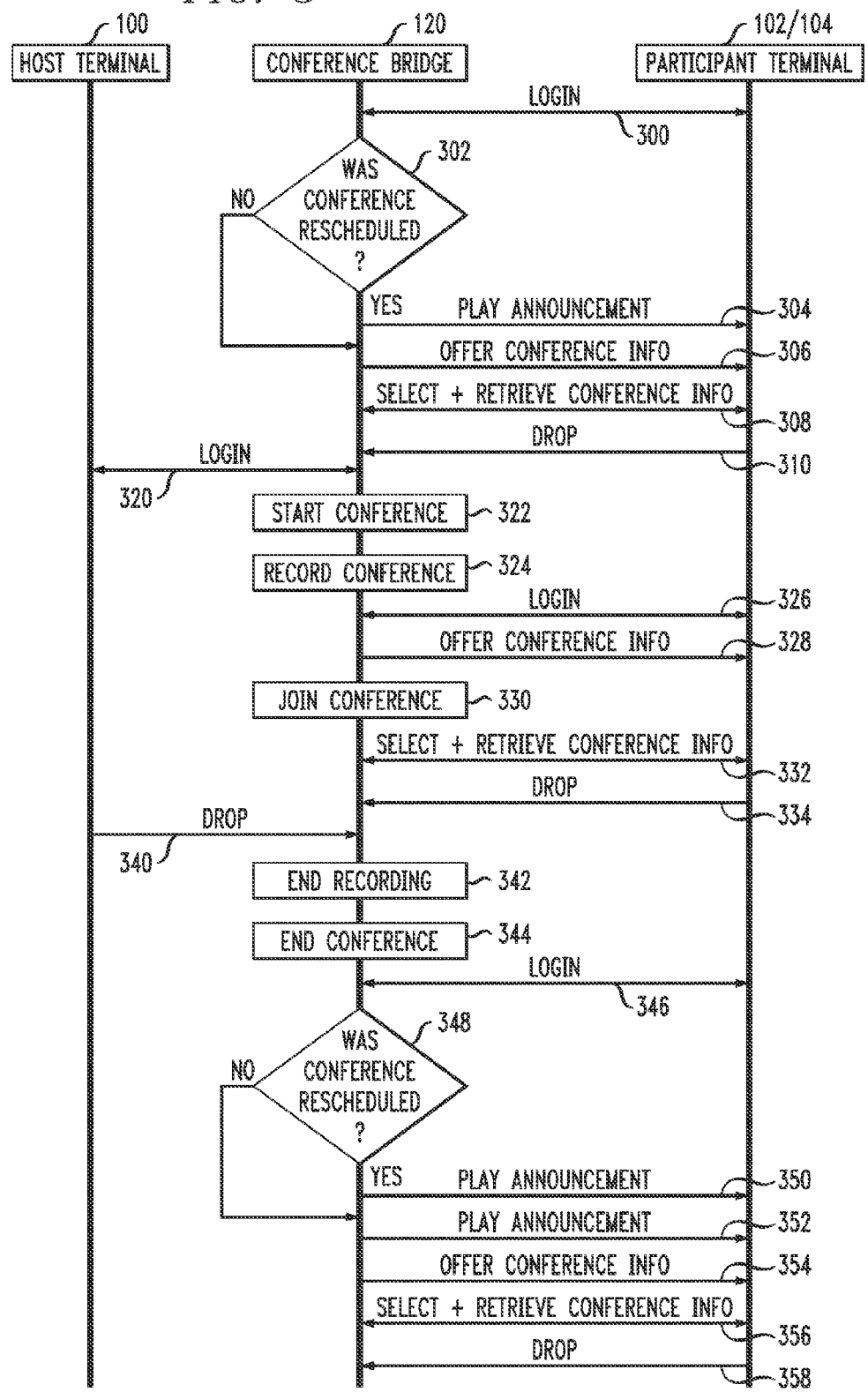

According to an aspect of the invention, conference bridge 120 provides functionality for providing conference-supplementing information to terminals 100-104. For this purpose, conference bridge 120 includes an enhanced conferencing program 130, a text-to-speech conversion (TTS) program 132, and an interactive voice response (IVR) program 134. In support of this functionality of conference bridge 120, the functionalities of email server 110 and email client 106 are also enhanced. The functionality of conference bridge 120 and email server 110 and their interaction with each other and with terminals 100-104 that is relevant to an understanding of this aspect of the invention is shown in FIGS. 2 and 3.

When a user of one of terminals 100-104—let us assume the user of terminal 100—, referred to as the host, wishes to schedule a conference, he or she invokes the conventional "create conference" function on email client 106. In response, client 106 of terminal 100 presents the host with a template that includes the conference call-in telephone number and the host's conference host access code and participant access code, and that enables the host to enter information that is required for scheduling the conference, such as the date and time for the conference and a list of desired attendees (invitees), as is conventional. Additionally, the host can populate the template with optional conference-supplementing information that pertains to the conference, such as a conference agenda, contact information for the host, a download location for documents that are relevant to the conference, identifiers of archived recordings of prior conferences in a series of conferences to which this conference belongs, etc. When the host is done filling out the template, e-mail client 106 of terminal 100 sends a "create conference" request that includes the filled-out template to email server 110, at step 200 of FIG. 2. Upon receiving the request, email server 110 generates a unique conference identifier that uniquely identifies this conference, at step 202. Illustratively, the conference identifier may comprise the host's conventional unique conference host access code supplemented with a sequential number of this conference, but any unique identifier will do. Email server then 110 causes calendar application 112 to create in the calendars of the host and of the invitees an entry for the date and time of the conference, at step 204, in a conventional manner. The invitees' entries are tentative, subject to acceptance or rejection by the invitees. The calendar entries include the conference identifier. Calendar application 112 will notify the host of the conference before or at the scheduled date and time, in a conventional manner. Email server 110 then sends the "create conference" request including the template information and the conference identifier to conference bridge 120, at step 206.

In response, conference bridge 120 under control of conferencing program 130 stores the template information and conference identifier, at step 208. Conference bridge 120 then returns an acknowledgment packet containing the conference identifier to email server 110, at step 214.

Email server 110 forwards the acknowledgment to the host's terminal 100, at step 218. Email server 110 then sends a conference "invite" message to the mailbox of each of the conference invitees, at step 220. The invite message includes the date and time of the conference and the host and participant access codes, as is conventional, and additionally includes the conference identifier.

An invitee accesses and retrieves the "invite" message via their email client 106. If the invitee signals their acceptance of the invite on their terminal 102-104 (thereby choosing to become a participant in the conference), the participant's email client 106 sends an "accept" message to email server 110, at step 230. In response to the "accept" message, email server 110 causes calendar application 112 to update the calendar entry for the conference of the participant from tentative to definitive (accepted) status, at step 232, in a conventional manner. Calendar application 112 will notify each participant of the conference before or at the scheduled date and time, in a conventional manner. Email server 110 also notifies the conference host of the acceptance, at step 234, also conventionally.

Now assume that the host decides to reschedule the conference to another date or time. The host uses their email client 106 to open the meeting entry in calendar application 112, changes the date and time for the conference, and selects to have the invitees notified, all in a conventional manner. In response, email client 106 of terminal 100 sends a "change conference" request to email server 110, at step 240. The request includes the conference identifier.

Upon receiving the email, email server 110 causes calendar application 112 to change the date and/or time for the conference in the host's and invitees' calendars by substituting a new entry for the conference in the calendars, at step 242, in a conventional manner. Email server 110 then sends the change conference request, including the conference identifier, to conference bridge 120, at step 246.

In response, conference bridge 120 under control of conferencing program 130 generates and stores in association with the conference identifier a text of an announcement stating that the conference has been rescheduled and indicating the new date and/or time for the conference, at step 246. Conference bridge 120 then returns an acknowledgment to email server 110, at step 248.

In response, email server 110 forwards the acknowledgment to the host, at step 250, and sends a conference change "invite" message to the mailbox of each of the invitees, at step 252. If an invitee retrieves and accepts the conference change "invite" message (in the same manner as they accessed and accepted the original conference "invite"), their calendar entry of the conference is changed correspondingly, in a conventional manner.

But what if a participant does not open the conference change "invite" message or does not check their calendar? Then the participant operates under the misapprehension that the conference is still scheduled for its originally-scheduled date and time.

A participant attempts to join a conference by logging into conference bridge 120 in a conventional manner, at step 300 of FIG. 3, such as by calling the conference bridge telephone number via a terminal 102-104 and entering the participant access code. In addition, the participant enters the conference identifier of the desired conference to uniquely identify the desired conference to conference bridge 120.

If the participant has attempted to join the conference before the host, then the conference has not started yet. In response to the participant logging in before the start of the conference, conferencing program 130 checks its records to determine if this conference had been rescheduled from its original date or time, at step 302. If so, conference bridge 120 uses TTS program 132 to play to the participant the announcement informing the participant of the rescheduling and of the new date or time for the conference, at step 304. Thereafter, or if the conference has not been rescheduled, conference bridge 120 uses IVR program 134 to offer the conference-enhancing information that it has stored at step 210, at step 306, and to interact with the participant to enable them to select and obtain any of the offered information, at step 308. If the conference starts while the participant is logged in, the participant is joined to the conference. Otherwise, the participant eventually drops from the conference bridge 120, at step 310.

A conference begins when the host logs into the conference on bridge 120, at step 320, in a conventional manner. As a part of the login, the host provides conference bridge 120 with the conference identifier of the desired conference to uniquely identify the desired conference. In response to the login, bridge 120 starts the conference, at step 322, in a conventional manner, and begins to record the conference, at step 324. If a participant attempts to join the conference by logging into conference bridge 120 and provides the conference identifier of the desired conference while the conference is in progress, at step 326, conference bridge uses IVR program 134 to offer the conference-enhancing information to the participant, at step 328. Illustratively, the participant is given the option to toggle at any time between participating in the conference and retrieving the conference-enhancing information. The participant is then joined into the conference, at step 330. By toggling, the participant can at any time interact with IVR program 134 to obtain the conference-enhancing information, at step 332. Eventually, the participant drops from the conference, at step 334, either before or at the end of the conference.

A conference ends when the host drops therefrom, at step 340. In response, conference bridge 120 stops recording the conference, at step 342, and terminates the conference, at step 344, in a conventional manner. If a participant attempts to join the conference by logging into conference bridge 120 and provides the conference identifier of the desired conference after the conference has ended, at step 346, conferencing program 130 checks its records to determine if this conference has been rescheduled from its original date of time, at step 348. If so, conference bridge 120 uses TTS program 132 to play to the participant the announcement informing the participant of the rescheduling and of the new date or time for the conference, at step 350. Thereafter, or if the conference had not been rescheduled, conference bridge 120 uses TTS program 132 to play to the participant an announcement informing the participant that the conference is over, at step 352. Conference bridge 120 then uses IVR program 134 to offer the conference-enhancing information and the conference recording to the participant, at step 354, and interacts with the participant to enable them to select and obtain any of the offered information, at step 356. The participant then drops from the conference bridge, at step 358.

Of course, various changes and modifications to the illustrative embodiment described above will be apparent to those skilled in the art. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   in response to scheduling of a conference for a first date and time, associating an identifier that uniquely identifies the conference with the conference, wherein the unique identifier is different from an address of a conference bridge, a host passcode, and a user passcode, storing a template, populated by a host of the conference with information pertaining to the conference, in association with the identifier, and providing the unique identifier to the host and to the participants;
   sending invitations to the scheduled conference to the invitees;
   creating entries for the conference in electronic calendars of the host and at least those invitees that choose to be participants in the conference;
   in response to the host using the identifier to reschedule the conference, rescheduling the conference to a second date and/or time;
   sending invitations to the rescheduled conference to the invitees;
   replacing the entry for the conference in the electronic calendars of at least the host and at least those invitees that choose to be participants in the rescheduled conference with a new entry for the rescheduled conference;
   in response to a participant using the identifier to attempt to join the conference before the conference has begun, offering the information from the template to the participant, and determining whether the conference has been rescheduled;
   recording the conference;
   in response to the participant using the identifier to attempt to join the conference while the conference is in progress, offering the information from the template to the participant, and joining the participant to the conference;
   in response to the participant using the identifier to attempt to join the conference after the conference has ended, offering the information from the template and the recording of the conference to the participant, and determining whether the conference has been rescheduled; and
   in response to determining that the conference has been rescheduled, informing the participant (a) that the conference has been rescheduled to the second date and/or time and (b) of the second date and/or time.

2. The method of claim 1 further comprising:
   in response to the host invoking creation of the conference, providing the template to the host; and
   the host populating the template with the information pertaining to the conference.

3. A non-transitory computer-readable medium storing instructions which, when executed by at least one computer, cause the at least one computer to perform the method of claim 1 or 2.

4. An apparatus comprising:
   a server for scheduling of a conference for a first date and time, for associating an identifier that uniquely identifies the conference with the conference, wherein the unique identifier is different from an address of a conference bridge, a host passcode, and a user passcode, for causing a conference bridge to store a template populated by a host of the conference with information pertaining to the code in association with the unique identifier, for sending invitations to the scheduled conference to the invitees, and for creating entries for the conference in electronic calendars of the host and at least those invitees that choose to be participants in the conference, the server responsive to the host using the unique identifier to reschedule the conference, for rescheduling the conference to a second date and/or time, for informing the conference bridge of the rescheduling, for sending invitations to the rescheduled conference to the invitees, and for replacing the entry for the conference in the electronic calendar of at least the host and at least those invitees that choose to be participants in the rescheduled conference; and
   the conference bridge, for storing the populated template in association with the unique identifier, responsive to a participant using the identifier to attempt to join the conference before the conference has begun, for offering the information from the template to the participant, and for determining whether the conference has been rescheduled, for recording the conference, responsive to the participant using the identifier to attempt to join the conference while the conference is in progress, for offering the information from the template to the participant, and for joining the participant to the conference, responsive to the participant using the identifier to attempt to join the conference after the conference has ended, for offering the information from the template and the recording of the conference to the participant, and for determining whether the conference has been rescheduled, and responsive to determining that the conference has been rescheduled, for informing the participant (a) that the conference has been rescheduled to the second date and/or time and (b) of the second date and/or time.

* * * * *